US012810382B2

(12) United States Patent
Kim et al.

(10) Patent No.: US 12,810,382 B2
(45) Date of Patent: Nov. 24, 2026

(54) IMAGE SIGNAL PROCESSOR AND METHOD FOR PROCESSING IMAGE SIGNAL

(71) Applicant: SK hynix Inc., Gyeonggi-do (KR)

(72) Inventors: Dong Gyun Kim, Gyeonggi-do (KR); Jeong Yong Song, Gyeonggi-do (KR); Jae Yoon Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 298 days.

(21) Appl. No.: 18/613,105

(22) Filed: Mar. 22, 2024

(65) Prior Publication Data

US 2024/0320788 A1 Sep. 26, 2024

(30) Foreign Application Priority Data

Mar. 23, 2023 (KR) ........................ 10-2023-0038184

(51) Int. Cl.
*G06T 3/4015* (2024.01)
*G06T 7/90* (2017.01)

(52) U.S. Cl.
CPC .............. *G06T 3/4015* (2013.01); *G06T 7/90* (2017.01); *G06T 2207/10024* (2013.01)

(58) Field of Classification Search
CPC ..................... G06T 3/4015; G06T 7/90; G06T 2207/10024; G06V 10/42
See application file for complete search history.

(56) References Cited

U.S. PATENT DOCUMENTS

| | | | | |
|---|---|---|---|---|
| 2008/0240559 A1* | 10/2008 | Malvar | G06T 3/4015 | 348/E9.037 |
| 2012/0257821 A1* | 10/2012 | Saito | G06T 3/4015 | 382/162 |
| 2017/0223383 A1* | 8/2017 | Saini | G06T 7/0004 | |
| 2021/0099682 A1* | 4/2021 | Takahashi | H04N 9/3185 | |
| 2021/0297610 A1* | 9/2021 | Rebiere | G06T 3/4015 | |

FOREIGN PATENT DOCUMENTS

| | | | |
|---|---|---|---|
| CN | 115147278 A * | 10/2022 | G06T 3/4007 |
| KR | 10-1633946 B1 | 6/2016 | |
| KR | 10-1794726 B1 | 11/2017 | |

* cited by examiner

*Primary Examiner* — Emily C Terrell
*Assistant Examiner* — Jacqueline R Zak
(74) *Attorney, Agent, or Firm* — IP & T GROUP LLP

(57) ABSTRACT

An image signal processor and an image signal processing method are disclosed. The image signal processor includes a stripe pattern determiner configured to calculate a gradient index for each of a plurality of directions in a target kernel and determine whether the target kernel corresponds to a stripe pattern based on the gradient index for each of the plurality of directions, a pattern direction determiner configured to determine a pattern direction of the target kernel when the target kernel corresponds to the stripe pattern, and a demosaicing component configured to perform an interpolation operation based on the pattern direction of the target kernel.

16 Claims, 7 Drawing Sheets

```
IF (((GRAD1 +GRAD2)·2) < GRAD3) && (((GRAD1 +GRAD2)·2) < GRAD4) ⇒ Stripe Condition
  stripe pattern

Else
  normal pattern
```

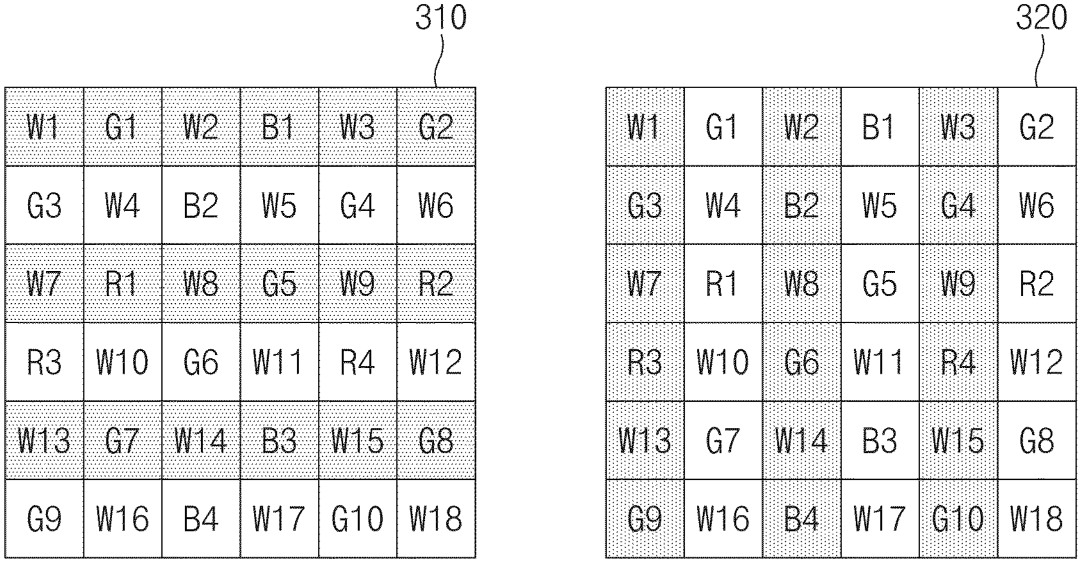

GRAD1
= abs(W1−W2)+abs(W2−W3)+abs(W4−W5)+abs(W5−W6)
+abs(W7−W8)+abs(W8−W9)+abs(W10−W11)+abs(W11−W12)
+abs(W13−W14)+abs(W14−W15)+abs(W16−W17)+abs(W17−W18)

GRAD2
= abs(W1−W7)+abs(W7−W13)+abs(W4−W10)+abs(W10−W16)
+abs(W2−W8)+abs(W8−W14)+abs(W5−W11)+abs(W11−W17)
+abs(W3−W9)+abs(W9−W15)+abs(W6−W12)+abs(W12−W18)

GRAD3
= abs(W2−W4)+abs(W4−W7)+abs(W3−W5)+abs(W5−W8)
+abs(W8−W10)+abs(W10−W13)+abs(W6−W9)+abs(W9−W11)
+abs(W11−W14)+abs(W14−W16)+abs(W12−W15)+abs(W15−W17)

GRAD4
= abs(W3−W6)+abs(W2−W5)+abs(W5−W9)+abs(W9−W12)+abs(W1−W4)
+abs(W4−W8)+abs(W8−W11)+abs(W11−W15)+abs(W15−W18)
+abs(W7−W10)+abs(W10−W14)+abs(W14−W17)+abs(W13−W16)

FIG.4

```
IF (((GRAD1 +GRAD2)·2) < GRAD3) && (((GRAD1 +GRAD2)·2) < GRAD4) ⇒ Stripe Condition
  stripe pattern

Else
  normal pattern
```

CR1=EV1·EV3−EV2·EV4

EV1=(W7+2·W8+W9)/4
EV2=(R1+2·G5+R2)/4
EV3=(R3+2·G6+R4)/4
EV4=(W10+2·W11+W12)/4

CR2=EV5·EV7−EV6·EV8

EV5=(W2+2·W8+W14)/4
EV6=(B2+2·G6+B4)/4
EV7=(B1+2·G5+B3)/4
EV8=(W5+2·W11+W17)/4

```
IF (abs(CR1)< abs(CR2))
  Pattern Direction = Horizontal Direction

Else
  Pattern Direction = Vertical Direction
```

IMAGE SIGNAL PROCESSOR AND METHOD FOR PROCESSING IMAGE SIGNAL

CROSS-REFERENCE TO RELATED APPLICATION

This patent application claims priority and benefits of Korean patent application No. 10-2023-0038184, filed on Mar. 23, 2023, the disclosure of which is incorporated herein by reference in its entirety.

TECHNICAL FIELD

Embodiments of the present disclosure generally relate to an image signal processor capable of performing image conversion, and an image signal processing method using the same.

BACKGROUND

An image sensing device is a device for capturing optical images by converting light into electrical signals using a photosensitive semiconductor material which reacts to light. With the development of automotive, medical, computer and communication industries, the demand for high-performance image sensing devices has been increasing in various fields such as smart phones, digital cameras, game machines, IoT (Internet of Things), robots, security cameras and medical micro cameras.

In an original image captured by the image sensing device, pixels corresponding to different colors (e.g., red, blue, and green) are typically arranged according to a certain color pattern (e.g., Bayer pattern). In order to convert the original image into a complete image (e.g., RGB image), an operation for performing interpolation according to a predetermined algorithm is performed. Since this algorithm basically includes an operation of interpolating a pixel from which information is omitted using information of neighboring pixels, serious noise may occur in an image having a specific pattern due to limitations of the algorithm.

SUMMARY

In accordance with an embodiment of the present disclosure, an image signal processor may include a stripe pattern determiner configured to calculate a gradient index for each of a plurality of directions in a target kernel, and to determine whether the target kernel corresponds to a stripe pattern based on the gradient index for each of the plurality of directions; a pattern direction determiner configured to determine a pattern direction of the target kernel when the target kernel corresponds to the stripe pattern; and a demosaicing component configured to perform an interpolation operation based on the pattern direction of the target kernel.

In accordance with another embodiment of the present disclosure, an image signal processing method may include calculating a gradient index for each of a plurality of directions in a target kernel; determining whether the target kernel corresponds to a stripe pattern based on the gradient index for each of the plurality of directions; determining a pattern direction of the target kernel when the target kernel corresponds to the stripe pattern; and performing an interpolation operation based on the pattern direction of the target kernel.

In accordance with still another embodiment of the present disclosure, an electronic device may include a processor, and a memory storing instructions executed by the processor. The instructions, when executed by the processor, cause the electronic device to an image signal processor configured to: calculate a gradient index for each of a plurality of directions in a target kernel, determine whether the target kernel corresponds to a stripe pattern based on the gradient index for each of the plurality of directions, determine a pattern direction of the target kernel when the target kernel corresponds to the stripe pattern, and perform an interpolation operation based on the pattern direction of the target kernel.

BRIEF DESCRIPTION OF THE DRAWINGS

The above and other features and beneficial aspects of the embodiments of the present disclosure will become readily apparent with reference to the following detailed description when considered in conjunction with the accompanying drawings.

FIG. 4 is a diagram illustrating for describing a method for calculating a gradient index for each direction of a target kernel based on an embodiment of the present disclosure.

DETAILED DESCRIPTION

Figure 1:
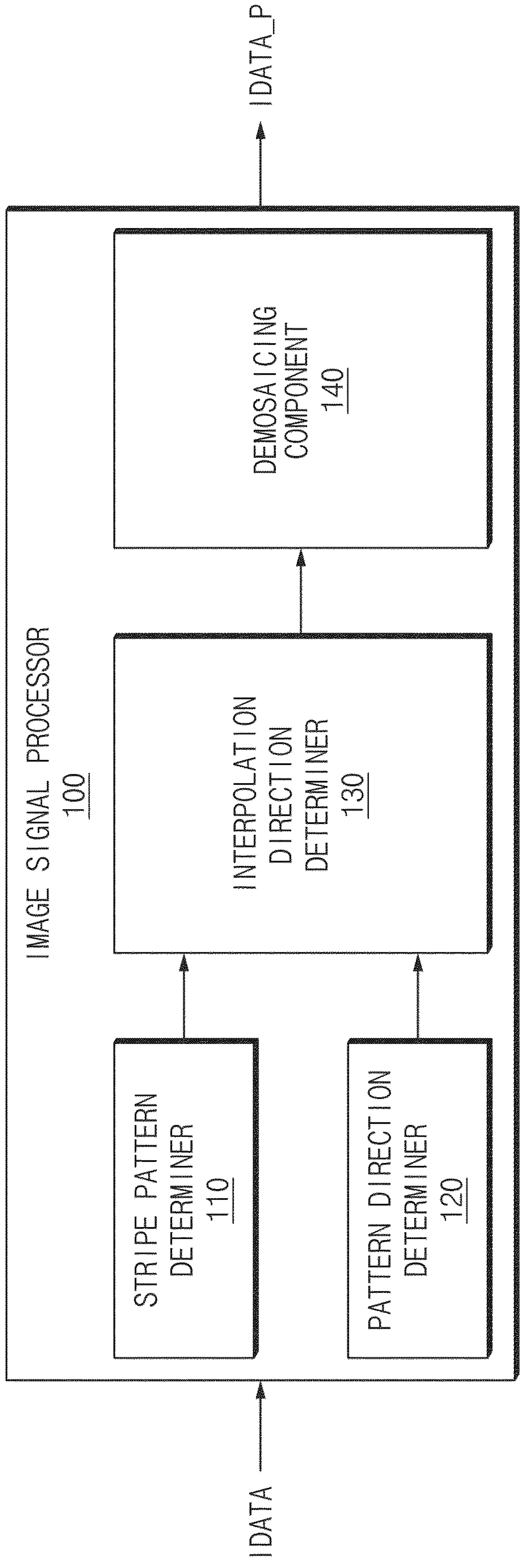
FIG. 1 is a block diagram illustrating a configuration of an image signal processor based on an embodiment of the present disclosure.

Various embodiments of the present disclosure provide an image signal processor capable of performing image conversion that may be used in configurations to substantially address one or more technical or engineering issues and to mitigate limitations or disadvantages encountered in some other image signal processors. Some embodiments of the present disclosure relate to an image signal processor capable of increasing the accuracy of demosaicing, and an image signal processing method for the same. In recognition of the issues above, the image signal processor and the image signal processing method based on some embodiments of the present disclosure may perform interpolation by determining an accurate interpolation direction for an image corresponding to a stripe pattern, thereby improving image quality.

Reference will now be made in detail to the embodiments of the present disclosure, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, this disclosure should not be construed as being limited to the embodiments set forth herein.

Hereinafter, various embodiments will be described with reference to the accompanying drawings. However, it should be understood that the embodiments of the present disclosure are not limited to specific embodiments, but include various modifications, equivalents and/or alternatives of the embodiments. The embodiments of the present disclosure provide a variety of advantageous effects capable of being directly or indirectly recognized by one of ordinary skill in the art.

Various embodiments of the present disclosure relate to an image signal processor capable of increasing the accuracy of demosaicing, and an image signal processing method using the same.

It is to be understood that both the foregoing general description and the following detailed description of the embodiments of the present disclosure are illustrative and descriptive, and are intended to provide further description of the embodiments as claimed.

FIG. 1 is a block diagram illustrating a configuration of an image signal processor 100 based on an embodiment of the present disclosure.

Referring to FIG. 1, the image signal processor (ISP) 100 may perform at least one image signal process on image data (IDATA) to generate the processed image data (IDATA_P).

The image signal processor (ISP) 100 may reduce noise of image data (IDATA), and may perform various types of image signal processing (e.g., demosaicing, defect pixel correction, gamma correction, color filter array interpolation, color matrix, color correction, color enhancement, lens distortion correction, etc.) for image-quality improvement of the image data. In addition, the ISP 100 may compress image data that has been created by execution of image signal processing for image-quality improvement, such that the image signal processor (ISP) 100 can create an image file using the compressed image data. Alternatively, the image signal processor (ISP) 100 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created.

The image data (IDATA) may be generated by an image sensing device that captures an optical image of a scene, but the embodiments of the present disclosure are not limited thereto. The image sensing device may include a pixel array including a plurality of pixels configured to sense incident light received from a scene, a control circuit configured to control the pixel array, and a readout circuit configured to output digital image data (IDATA) by converting an analog pixel signal received from the pixel array into the digital image data (IDATA). In some embodiments, the image data (IDATA) is generated by the image sensing device.

The pixel array may include a color filter array (CFA) in which color filters are arranged according to a predetermined pattern (e.g., a Bayer pattern, a quad-Bayer pattern, nona-Bayer pattern, an RGBW pattern, etc.) so that each color filter can sense light of a predetermined wavelength band. The pattern of the image data (IDATA) may be determined according to the type of the pattern of the CFA.

The image signal processor (ISP) 100 may include a stripe pattern determiner 110, a pattern direction determiner 120, an interpolation direction determiner 130, and a demosaicing component 140.

The stripe pattern determiner 110 may determine whether the original image data corresponds to a stripe pattern on a kernel basis. That is, the stripe pattern determiner 110 may determine whether the target kernel corresponds to the stripe pattern.

Here, the original image data may refer to image data (IDATA) or data obtained by pre-processing the image data (IDATA), and may correspond to a certain pattern (e.g., a Bayer pattern, a quad-Bayer pattern, a nona-Bayer pattern, an RGBW pattern, or the like.). In addition, a kernel may refer to a basic unit of image processing to be described below.

The stripe pattern may refer to a pattern in which pixels linearly arranged in a first direction have the same or similar pixel data, but pixels having different pixel data are alternately arranged in a second direction perpendicular to the first direction.

Figure 3:
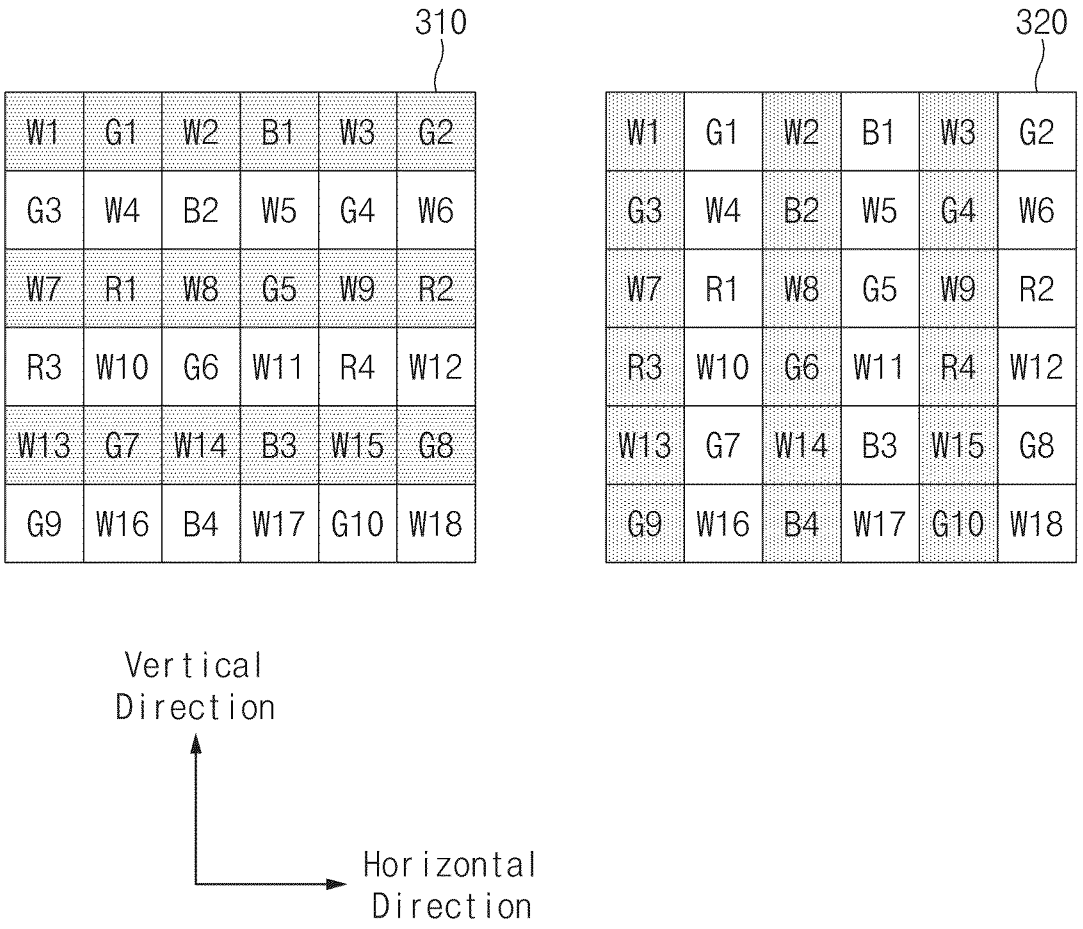
FIG. 3 is a diagram illustrating for describing a target kernel with a stripe pattern based on an embodiment of the present disclosure.

For example, when the first direction is a horizontal direction and the second direction is a vertical direction, the stripe pattern may be a horizontal stripe pattern (e.g., a first target kernel 310 in FIG. 3). Conversely, when the first direction is a vertical direction and the second direction is a horizontal direction, the stripe pattern may be a vertical stripe pattern (e.g., a second target kernel 320 in FIG. 3).

In an embodiment, the stripe pattern determiner 110 may calculate a gradient index for each direction within the target kernel, and may determine whether the target kernel corresponds to a stripe pattern based on the calculated gradient index. Here, each direction may correspond to a horizontal direction, a vertical direction, a first diagonal direction (slash direction '/', i.e., a direction from the right-upper side to the left-lower side), or a second diagonal direction (backslash direction \\', i.e., a direction from the left-upper side to the right-lower side). The gradient index may represent a result of summing gradients between pixel data of the same type of pixels (i.e., homogeneous pixels) arranged in each direction within the target kernel.

When the stripe pattern determiner 110 determines that the target kernel corresponds to a stripe pattern, the pattern direction determiner 120 may determine a pattern direction of the stripe pattern corresponding to the target kernel. In an embodiment, the pattern direction determiner 120 may determine whether the pattern direction of the stripe pattern corresponding to the target kernel is horizontal or vertical.

The interpolation direction determiner 130 may determine an interpolation direction for the target kernel.

If the target kernel does not correspond to the stripe pattern, the interpolation direction determiner 130 may determine the interpolation direction by detecting an edge based on the gradient index for each direction of the target kernel.

If the target kernel corresponds to the stripe pattern, the interpolation direction determiner 130 may determine the interpolation direction based on the pattern direction of the stripe pattern corresponding to the target kernel. For example, when the pattern direction of the stripe pattern is the horizontal direction, the interpolation direction determiner 130 may determine the horizontal direction as the interpolation direction. In addition, when the pattern direction of the stripe pattern is the vertical direction, the interpolation direction determiner 130 may determine the vertical direction as the interpolation direction.

The demosaicing component 200 may generate interpolated image data by interpolating original image data. The original image data having such a certain pattern includes pixel data corresponding to only one color per pixel. However, in order to express a complete image for human eyes, pixel data corresponding to each of red, green, and blue may be required for each pixel. For example, original image data having a Bayer pattern may include data corresponding to red, green, or blue per pixel, and interpolation may refer to an operation of generating (or estimating) data corresponding to the remaining two colors for one pixel corresponding to red, green or blue. Here, pixel data may refer to image data corresponding to one pixel, and a set (or aggregate) of pixel data corresponding to one frame may constitute original image data.

Interpolation may be performed in units of a kernel having a predetermined size (e.g., 6×6), and may refer to an operation of calculating (i.e., linear interpolation) at least one pixel data located in the interpolation direction determined by the interpolation direction determiner 130 within the kernel, a center portion of which includes the target pixel to be interpolated, and calculating pixel data corresponding to other colors different from that of the target pixel. For example, the demosaicing component 140 may generate RGB image data by interpolating the original image data.

When the pattern of the original image data is RGBW, interpolation for the target pixel serving as a white pixel may include two interpolation operations to be performed in stages. That is, the demosaicing component 140 may interpolate a white pixel into a color pixel based on at least one color pixel (e.g., R pixel, G pixel, or B pixel) adjacent to the white pixel from among the original image data, and may calculate at least one pixel data located in the interpolation direction so as to calculate pixel data corresponding to colors different from that of the target pixel, so that the interpolation operation can be completed.

In an embodiment, if the target kernel does not correspond to the stripe pattern, the demosaicing component 140 may generate RGB image data by performing the interpolation operation based on the interpolation direction determined by the interpolation direction determiner 130.

In some other embodiments, if the target kernel corresponds to a horizontal stripe pattern, the demosaicing component 140 may generate RGB image data by performing interpolation based on the horizontal direction. At this time, the demosaicing component 140 may perform interpolation using pixel data of a pixel belonging to a row having the same attributes as the row to which the target pixel belongs, without using pixel data of a pixel belonging to a row having different attributes from the row to which the target pixel belongs. Here, the attributes of the row may be determined depending on whether the corresponding row is an even-numbered row or an odd-numbered row. For example, when the row to which the target pixel belongs is an even-numbered row, the demosaicing component 140 may perform interpolation using the pixel data of the pixel belonging to the even-numbered row without using the pixel data of the pixel belonging to the odd-numbered row.

In an embodiment, if the target kernel corresponds to a vertical stripe pattern, the demosaicing component 140 may generate RGB image data by performing interpolation based on the vertical direction. At this time, the demosaicing component 140 may perform interpolation using pixel data of a pixel belonging to a column having the same attributes as the column to which the target pixel belongs, without using pixel data of a pixel belonging to a column having different attributes from the column to which the target pixel belongs. Here, the attributes of the column may be determined depending on whether the corresponding row is an even-numbered column or an odd-numbered column. For example, when the column to which the target pixel belongs is an even-numbered column, the demosaicing component 140 may perform interpolation using the pixel data of the pixel belonging to the even-numbered column without using the pixel data of the pixel belonging to the odd-numbered column.

Hereinafter, a method for more accurately determining the interpolation direction for original image data corresponding to a stripe pattern will be described with reference to the drawings below in FIG. 2.

Figure 2:
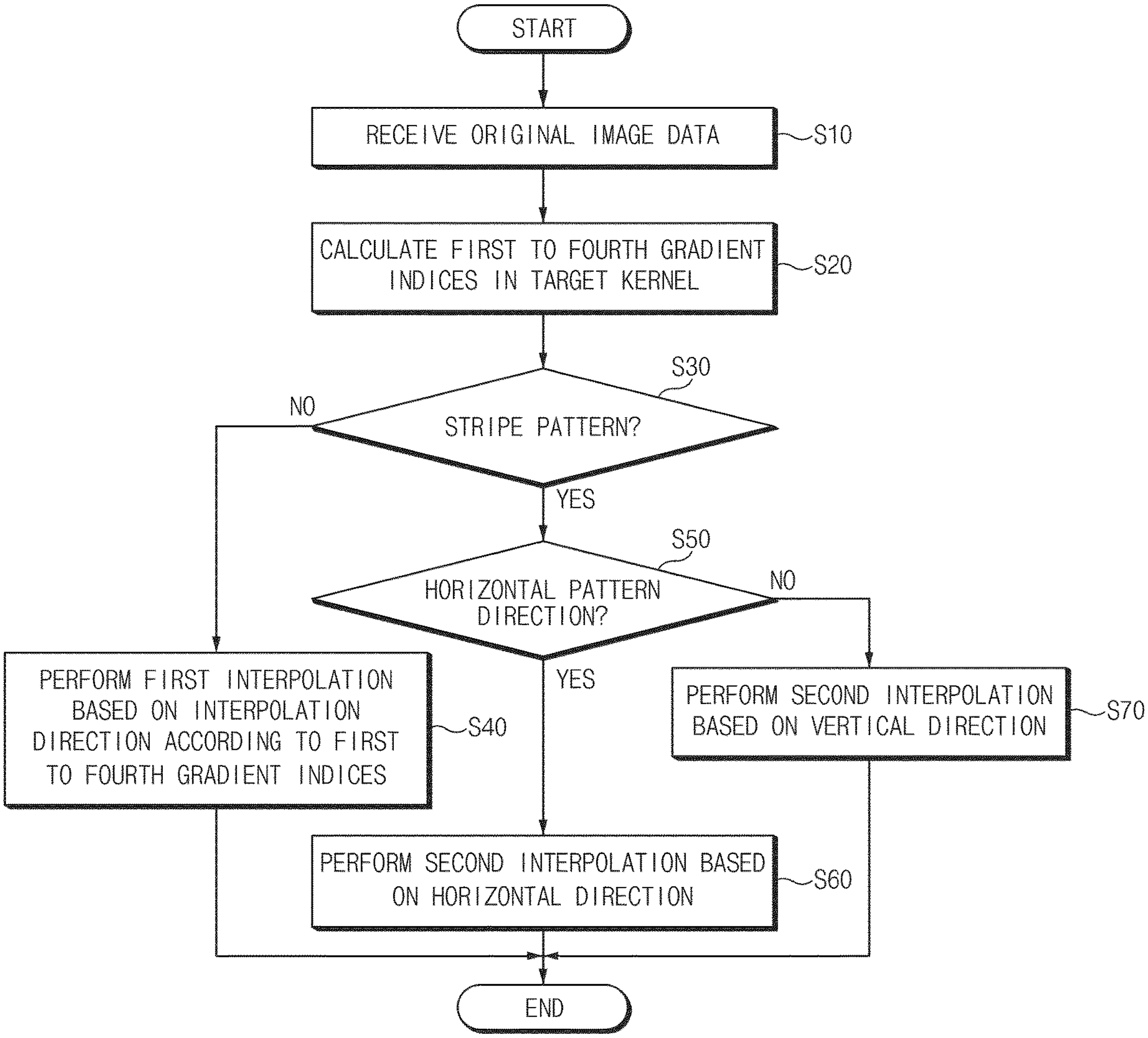
FIG. 2 is a flowchart for describing an image processing method based on an embodiment of the present disclosure.
Figure 5:
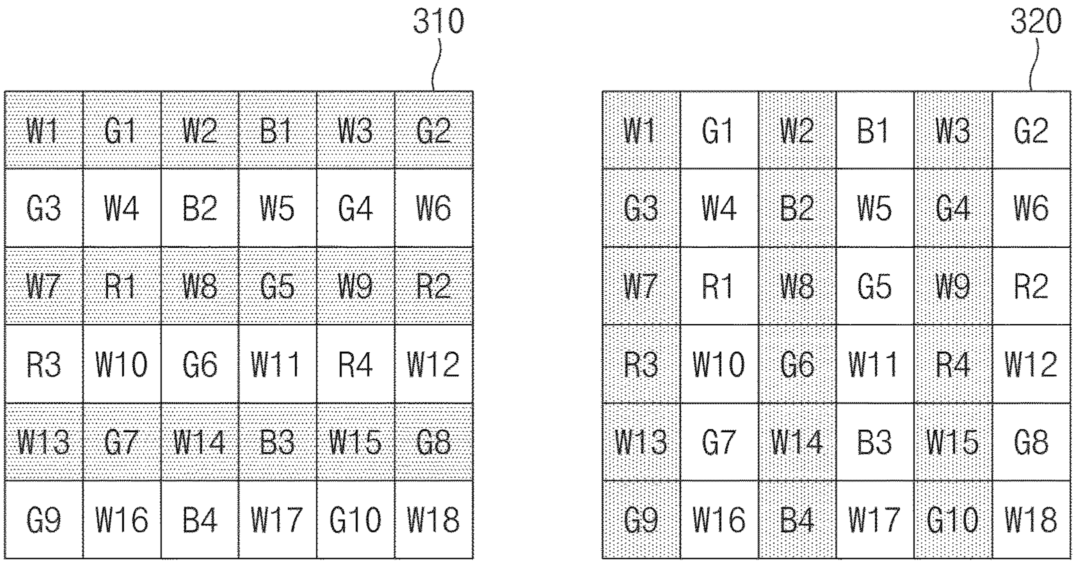
FIG. 5 is a diagram illustrating for describing a method for determining whether a target kernel corresponds to a stripe pattern based on an embodiment of the present disclosure.
Figure 6:
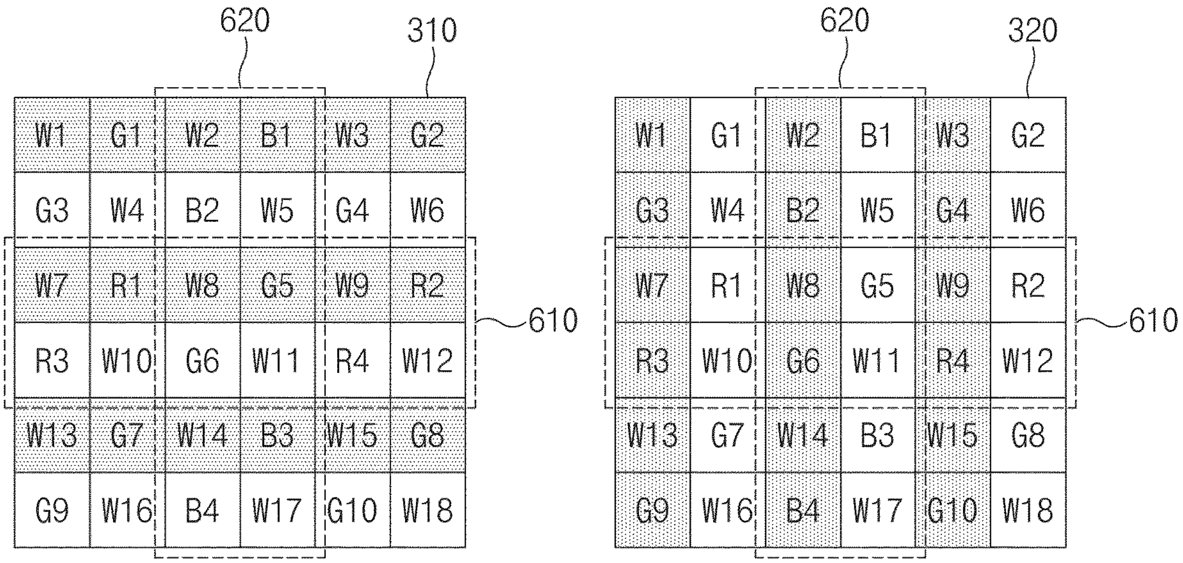
FIG. 6 is a diagram illustrating for describing a method for determining the direction of a stripe pattern based on an embodiment of the present disclosure.

FIG. 2 is a flowchart illustrating for describing an image processing method based on an embodiment of the present disclosure. FIG. 3 is a diagram illustrating for describing a target kernel with a stripe pattern. FIG. 4 is a diagram illustrating for describing a method for calculating a gradient index for each direction of a target kernel based on an embodiment of the present disclosure. FIG. 5 is a diagram illustrating for describing a method for determining whether a target kernel corresponds to a stripe pattern based on an embodiment of the present disclosure. FIG. 6 is a diagram illustrating for describing a method for determining the direction of a stripe pattern based on an embodiment of the present disclosure.

Referring to FIGS. 2 to 6, the stripe pattern determiner 110 may receive original image data (see operation S10). In the following description, the original image data has an RGBW pattern. The RGBW pattern may include pixel groups including two white pixels and two homogeneous color pixels (red pixels, green pixels, or blue pixels). In this case, in each pixel group in which two rows and two columns are arranged in a (2×2) matrix, two white pixels may be arranged in one diagonal direction (e.g., a first diagonal direction) and two color pixels may be arranged in another diagonal direction (e.g., a second diagonal direction). In addition, a pixel group containing red pixels may be defined as a red pixel group, a pixel group containing green pixels may be defined as a green pixel group, and a pixel group containing blue pixels may be defined as a blue pixel group. In the RGBW pattern, the red pixel group, the green pixel group, and the blue pixel group may be arranged in a Bayer pattern. In an embodiment, a red pixel may refer to a pixel for detecting light in a wavelength band corresponding to a red color, a green pixel may refer to a pixel for detecting light in a wavelength band corresponding to a green color, and a blue pixel may refer to a pixel for detecting light in a wavelength band corresponding to a blue color. In addition, a white pixel may refer to a pixel for detecting light in the entire wavelength band of visible light. Since red pixels, green pixels, and blue pixels are pixels corresponding to specific colors, the red pixels, the green pixels, and the blue pixels may be collectively referred to as color pixels.

In FIG. 3, the first target kernel 310 corresponding to a horizontal stripe pattern in the horizontal direction and the second target kernel 320 corresponding to a vertical stripe pattern in the vertical direction are illustrated. Pixels shaded in FIG. 3 correspond to pixels with relatively low pixel data, and pixels not shaded in FIG. 3 correspond to pixels with relatively high pixel data. Here, a difference between pixel data of the pixels shaded in FIG. 3 and pixel data of the pixels not shaded in FIG. 3 may correspond to a sufficiently large difference when viewed with the naked eye.

In the first target kernel 310, pixels (e.g., W1, G1, W2, B1, W3, G2) linearly arranged in a horizontal direction may have the same or similar pixel data, but pixels (e.g., W1, G3, W7, R3, W13, G9) having different pixel data may be alternately arranged in a vertical direction. The shaded pixels and the non-shaded pixels may constitute a shape corresponding to horizontal stripes.

In the second target kernel 320, pixels (e.g., W1, G3, W7, R3, W13, G9) linearly arranged in the vertical direction may have the same or similar pixel data, but pixels (e.g., W1, G1, W2, B1, W3, G2) having different pixel data may be alternately arranged in the horizontal direction. The shaded pixels and the non-shaded pixels may constitute a shape corresponding to vertical stripes.

The stripe pattern determiner 110 may calculate first to fourth gradient indices in the target kernel of the original image data (see operation S20). In an embodiment, each of the first to fourth gradient indices may be calculated based on pixel data of homogeneous pixels (e.g., white pixels). This is because the gradient index, which is a basis for determining directionality, must be calculated using homogeneous pixels. In more detail, since the white pixels from among pixels of the target kernel have the highest ratio, the amount of information of the white pixels is the largest.

In FIG. 4, a first gradient index (GRAD1) may refer to a gradient index in the horizontal direction, and may be a value obtained by summing differences between pixel data values of white pixels (e.g., W1 and W2, W2 and W3, W4 and W5, etc.) arranged adjacent to each other in the horizontal direction. In the equations of FIG. 4, 'abs(x)' may mean an absolute value of 'x', where 'x' is an arbitrary value.

A second gradient index (GRAD2) may refer to a gradient index in the vertical direction, and may be a value obtained by summing differences between pixel data values of white pixels (e.g., W1 and W7, W7 and W13, W4 and W10, etc.) arranged adjacent to each other in the vertical direction.

A third gradient index (GRAD3) may refer to a gradient index in the first diagonal direction, and may be a value obtained by summing differences between pixel data values of white pixels (e.g., W2 and W4, W4 and W7, W3 and W5, etc.) arranged adjacent to each other in the first diagonal direction.

A fourth gradient index (GRAD4) may refer to a gradient index in the second diagonal direction, and may be a value obtained by summing differences between pixel data values of white pixels (e.g., W3 and W6, W2 and W5, W5 and W9, etc.) arranged adjacent to each other in the second diagonal direction.

The stripe pattern determiner 110 may determine whether the target kernel corresponds to a stripe pattern based on the first to fourth gradient indices (GRAD1~GRAD4) (see operation S30).

In FIG. 5, one color pixel may be disposed between white pixels adjacent to each other in the horizontal or vertical direction within the target kernels (310~320) each having an RGBW pattern. That is, white pixels may be spaced apart from each other by a predetermined distance corresponding to one pixel in the horizontal or vertical direction, and may be arranged alternately with color pixels.

Since the target kernels (310~320) each having the RGBW pattern correspond to a horizontal stripe pattern or a vertical stripe pattern, white pixels arranged adjacent to each other in the horizontal or vertical direction have the same or similar pixel data, so that the first gradient index (GRAD1) or the second gradient index (GRAD2) may have a value close to zero '0'.

On the other hand, the white pixels arranged adjacent to each other in the first or second diagonal direction in the target kernels (310~320) each having the RGBW pattern may have different pixel data, so that the third gradient index (GRAD3) or the fourth gradient index (GRAD4) may have a much larger value than the first gradient index (GRAD1) or the second gradient index (GRAD2).

FIG. 5 illustrates a stripe condition, which is a conditional expression for determining whether the target kernel corresponds to a stripe pattern. The stripe condition is an example of a conditional expression for determining whether the target kernel corresponds to the stripe pattern using the characteristics of the first to fourth gradient indices (GRAD1~GRAD4) in the target kernels (310~320) each having the RGBW pattern, without being limited thereto.

The stripe condition of FIG. 5 may be a condition in which the third gradient index (GRAD3) is greater than a value obtained when the sum of the first gradient index (GRAD1) and the second gradient index (GRAD2) is multiplied by a predetermined weight (e.g., 2), and the fourth gradient index (GRAD4) is greater than a value obtained when the sum of the first gradient index (GRAD1) and the second gradient index (GRAD2) is multiplied by a predetermined weight (e.g., 2).

The stripe pattern determiner 110 may determine that the target kernel corresponds to the stripe pattern when the target kernel satisfies the stripe condition based on the first to fourth gradient indices (GRAD1~GRAD4). The stripe pattern determiner 110 may determine that the target kernel corresponds to a normal pattern when the target kernel does not satisfy the stripe condition based on the first to fourth gradient indices (GRAD1~GRAD4). Here, the normal pattern may mean a general term for patterns that do not correspond to the stripe pattern.

Referring back to FIG. 2, when the target kernel does not correspond to the stripe pattern ('No' in the operation S30), the interpolation direction determiner 130 may detect the edge by comparing the first to fourth gradient indices (GRAD1~GRAD4) of the target kernel with each other, so that the interpolation direction determiner 130 may determine the interpolation direction. As a result, the demosaicing component 140 may generate RGB image data by performing the interpolation operation (i.e., a first interpolation operation) based on the interpolation direction determined by the interpolation direction determiner 130 (see operation S40). Here, the interpolation operation may be defined as first interpolation.

When the target kernel corresponds to the stripe pattern ('Yes' in the operation S30), the pattern direction determiner 120 may determine the pattern direction of the stripe pattern corresponding to the target kernel (see operation S50).

In FIG. 6, a horizontal pixel block 610, which includes a center pixel group (W8, G5, G6, W11) located at the center of the target kernel 310 or 320, a left pixel group (W7, R1, R3, W10) located at the left side from the center pixel group, and a right pixel group (W9, R2, R4, W12) located at the right side from the center pixel group, may be defined.

In FIG. 6, a vertical pixel block 620, which includes a center pixel group (W8, G5, G6, W11) located at the center of the target kernel 310 or 320, an upper pixel group (W2, B1, B2, W5) located at the upper side from the center pixel group, and a lower pixel group (W14, B3, B4, W17) located at the lower side from the center pixel group, may be defined.

The pattern direction determiner 120 may calculate a first color ratio index (CR1) from the horizontal pixel block 610, and may calculate a second color ratio index (CR2) from the vertical pixel block 620.

The first color ratio index (CR1) may be obtained by calculating first to fourth average values (EV1~EV4).

The first average value (EV1) may correspond to an average of the weighted sum of pixel data of the white pixels (W7, W8, W9) belonging to an upper row of the horizontal pixel block 610. At this time, the highest weight '2' may be assigned to the white pixel (W8) located at the center of the target kernel.

The second average value (EV2) may correspond to an average of the weighted sum of pixel data of the color pixels (R7, G5, R2) belonging to an upper row of the horizontal pixel block 610. At this time, the highest weight '2' may be assigned to the green pixel (G5) located at the center of the target kernel.

The third average value (EV3) may correspond to an average of the weighted sum of pixel data of the color pixels (R3, G6, R2) belonging to a lower row of the horizontal pixel block 610. At this time, the highest weight '2' may be assigned to the green pixel (G6) located at the center of the target kernel.

The fourth average value (EV4) may correspond to an average of the weighted sum of pixel data of the white pixels (W10, W11, W12) belonging to a lower row of the horizontal pixel block 610. At this time, the highest weight '2' may be assigned to the white pixel (W11) located at the center of the target kernel.

The first color ratio index (CR1) may be a value that becomes zero '0' when the ratio of colors between the color pixels (R1, G5, R2) and the white pixels (W7, W8, W9) belonging to the upper row is identical to the ratio of colors between the color pixels (R3, G6, R2) and the white pixels (W10, W11, W12) belonging to the lower row. In more detail, the first color ratio index (CR1) for the first target kernel 310 corresponding to the horizontal stripe pattern may have a relatively low value, and the first color ratio index (CR1) for the second target kernel 320 corresponding to the vertical stripe pattern may have a relatively high value. The first color ratio index (CR1) may indicate the degree to which two color ratios are maintained. As the two color ratios are maintained, the first color ratio index (CR1) may have a lower value, so that the target kernel may have a pattern similar to a horizontal stripe pattern.

The second color ratio index (CR2) may be obtained by calculating the fifth to eighth average values (EV5~EV8).

The fifth average value (EV5) may correspond to an average of the weighted sum of pixel data of the white pixels (W2, W8, W14) belonging to a left row of the vertical pixel block 620. At this time, the highest weight '2' may be assigned to the white pixel (W8) located at the center of the target kernel.

The sixth average value (EV6) may correspond to an average of the weighted sum of pixel data of the color pixels (B2, G6, B4) belonging to a left row of the vertical pixel block 620. At this time, the highest weight '2' may be assigned to the green pixel (G6) located at the center of the target kernel.

The seventh average value (EV7) may correspond to an average of the weighted sum of pixel data of the color pixels (B1, G5, B3) belonging to a right row of the vertical pixel block 620. At this time, the highest weight '2' may be assigned to the green pixel (G5) located at the center of the target kernel.

The eighth average value (EV8) may correspond to an average of the weighted sum of pixel data of the white pixels (W5, W11, W17) belonging to a right row of the vertical pixel block 620. At this time, the highest weight '2' may be assigned to the white pixel (W11) located at the center of the target kernel.

The second color ratio index (CR2) may be a value that becomes zero '0' when the ratio of colors between the color pixels (B2, G6, B4) and the white pixels (W2, W8, W14) belonging to the left row is identical to the ratio of colors between the color pixels (B1, G5, B3) and the white pixels (W5, W11, W17) belonging to the right row. In more detail, the second color ratio index (CR2) for the first target kernel 310 corresponding to the horizontal stripe pattern may have a relatively high value, and the second color ratio index (CR2) for the second target kernel 320 corresponding to the vertical stripe pattern may have a relatively high value. The second color ratio index (CR2) may indicate the degree to which two color ratios are maintained. As the two color ratios are maintained, the second color ratio index (CR2) may have a lower value, so that the target kernel may have a pattern similar to a vertical stripe pattern.

The pattern direction determiner 120 may determine a pattern direction of a stripe pattern corresponding to the target kernel 310 or 320 based on the first color ratio index (CR1) calculated from the horizontal pixel block 610 and the second color ratio index (CR2) calculated from the vertical pixel block 620.

In an embodiment, the pattern direction determiner 120 may compare the absolute value of the first color ratio index (CR1) with the absolute value of the second color ratio index (CR2), and may determine the pattern direction of the stripe pattern corresponding to the target kernel 310 or 320.

If the absolute value of the first color ratio index (CR1) is less than the absolute value of the second color ratio index (CR2), the pattern direction determiner 120 may determine the pattern direction of the stripe pattern to be the horizontal direction.

If the absolute value of the first color ratio index (CR1) is greater than or equal to the absolute value of the second color ratio index (CR2), the pattern direction determiner 120 may determine the pattern direction of the stripe pattern to be the vertical direction. When the pattern direction of the stripe pattern is determined to be horizontal ('Yes' in the operation S50), the interpolation direction determiner 130 may determine the horizontal direction as the interpolation direction, and the demosaicing component 140 may generate RGB image data by performing the interpolation operation (i.e., a second interpolation operation) based on the horizontal direction (see operation S60). At this time, the demosaicing component 140 may perform interpolation using pixel data of a pixel belonging to a row having the same attributes (e.g., even row or odd row) as the row to which the target pixel belongs, without using pixel data of a pixel belonging to a row having different attributes from the row to which the target pixel belongs. This is because the pixel data of the row to which the target pixel belongs in the horizontal stripe pattern is significantly different from the pixel data of another row having different attributes from the row to which the target pixel belongs in the horizontal stripe pattern, and such pixel data is unsuitable as a reference pixel to be referenced during interpolation.

When the pattern direction of the stripe pattern is determined to be vertical ('No' in the operation S50), the interpolation direction determiner 130 may determine the vertical direction as the interpolation direction, and the demosaicing component 140 may generate RGB image data by performing the interpolation operation (i.e., second interpolation operation) based on the vertical direction (see operation S70). At this time, the demosaicing component 140 may perform interpolation using pixel data of a pixel belonging to a column having the same attributes (e.g., even column or odd column) as the column to which the target pixel belongs, without using pixel data of a pixel belonging to a column having different attributes from the column to which the target pixel belongs. This is because the pixel data of the column to which the target pixel belongs in the vertical stripe pattern is significantly different from the pixel data of another column having different attributes from the column to which the target pixel belongs in the vertical stripe pattern, and such pixel data is unsuitable as a reference pixel to be referenced during interpolation.

The interpolation operation described in the operations S60 and S70 may be defined as second interpolation.

According to the embodiments of the present disclosure, the image signal processor and the image processing method may perform interpolation by determining an accurate interpolation direction for an image corresponding to a stripe pattern, thereby improving image quality.

Although the above-described embodiments have been described using the RGBW pattern as an example for convenience of description, the scope or spirit of the present disclosure is not limited thereto, and the technical idea of the present disclosure can also be applied in substantially the same manner to the example case in which pixels that are the basis for determining directionality in the target kernel are periodically arranged and this periodicity matches the period of the stripe pattern.

Figure 7:
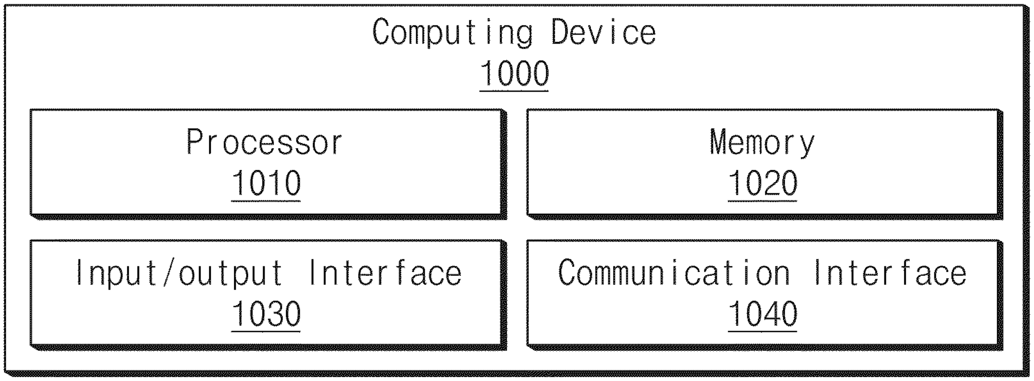
FIG. 7 is a block diagram illustrating a configuration of a computing device corresponding to the image signal processor of FIG. 1 based on an embodiment of the present disclosure.

FIG. 7 is a block diagram showing a configuration of a computing device 1000 corresponding to the image signal processor of FIG. 1.

Referring to FIG. 7, the computing device 1000 may represent an embodiment of a hardware configuration for performing the operation of the image signal processor 100 of FIG. 1.

The computing device 1000 may be mounted on a chip that is independent from the chip on which the image sensing device is mounted. According to one embodiment, the chip on which the image sensing device is mounted and the chip on which the computing device 1000 is mounted may be implemented in one package, for example, a multi-chip package (MCP), but the embodiments of the present disclosure are not limited thereto.

The computing device 1000 may include a processor 1010, a memory 1020, an input/output interface 1030, and a communication interface 1040.

The processor 1010 may process data and/or instructions required to perform the operations of the components (110~140) of the image signal processor 100 described in FIG. 1. That is, the processor 1010 may refer to the image signal processor 100, but the scope of the embodiments are not limited thereto.

The memory 1020 may store data and/or instructions required to perform operations of the components (110~140) of the image signal processor 100, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), etc.), EEPROM (Electrically Erasable PROM), flash memory, etc.).

That is, the computer program for performing the operations of the image signal processor 100 disclosed in present disclosure is recorded in the memory 1020 and executed and processed by the processor 1010, thereby implementing the operations of the image signal processor 100.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, external memory, etc.), and may be a device that supports wired or wireless communication.

As is apparent from the above description, the image signal processor based on an embodiment of the present disclosure may perform interpolation by determining an accurate interpolation direction for an image corresponding to a stripe pattern, thereby improving image quality.

The embodiments of the present disclosure provide a variety of advantageous effects capable of being directly or indirectly recognized by one of ordinary skill in the art.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. An image signal processor comprising:

a stripe pattern determiner configured to calculate a gradient index for each of a plurality of directions in a target kernel, and determine whether the target kernel corresponds to a stripe pattern based on the gradient index for each of the plurality of directions;

a pattern direction determiner configured to determine a pattern direction of the target kernel when the target kernel corresponds to the stripe pattern; and a demosaicing component configured to perform an interpolation operation based on the pattern direction of the target kernel, wherein the plurality of directions includes a horizontal direction, a vertical direction, a first diagonal direction, and a second diagonal direction, wherein gradient indices for the plurality of directions include a first gradient index for the horizontal direction, a second gradient index for the vertical direction, a third gradient index for the first diagonal direction, and a fourth gradient index for the second diagonal direction, wherein the stripe pattern determiner is configured to determine whether the target kernel corresponds to the stripe pattern depending on whether a stripe condition based on the first to fourth gradient indices is satisfied, and wherein the stripe condition is a condition in which the third gradient index is greater than a value obtained by multiplying a sum of the first gradient index and the second gradient index by a preset weight, and the fourth gradient index is greater than a value obtained by multiplying a sum of the first gradient index and the second gradient index by the preset weight.

2. The image signal processor according to claim 1, wherein the target kernel includes pixel data of a plurality of pixels arranged according to an RGBW pattern.

3. The image signal processor according to claim 2, wherein the RGBW pattern includes a pixel group formed in a (2×2) matrix including white pixels arranged in a first diagonal direction of the plurality of directions and color pixels arranged in a second diagonal direction of the plurality of directions.

4. The image signal processor according to claim 1, wherein each of the first to fourth gradient indices is a sum of differences in pixel data between homogeneous pixels arranged adjacent to each other in a corresponding direction in the target kernel.

5. The image signal processor according to claim 1, further comprising an interpolation direction determiner configured to determine an interpolation direction by comparing the first to fourth gradient indices with each other, when the target kernel does not correspond to the stripe pattern.

6. The image signal processor according to claim 1, wherein the stripe pattern includes one of:

a horizontal stripe pattern having a horizontal pattern direction; and a vertical stripe pattern having a vertical pattern direction.

7. The image signal processor according to claim 1, wherein the pattern direction determiner is configured to:

calculate a first color ratio index indicating a degree to which a color ratio between pixel data values of color and white pixels belonging to an upper row within a horizontal pixel block of the target kernel and another color ratio between pixel data values of color and white pixels belonging to a lower row within the horizontal pixel block of the target kernel, are maintained; and calculate a second color ratio index indicating a degree to which a color ratio between pixel data values of color and white pixels belonging to a left column within a vertical pixel block of the target kernel and another color ratio between pixel data values of color and white pixels belonging to a right column within the vertical pixel block of the target kernel, are maintained.

8. The image signal processor according to claim 7, wherein the first color ratio index is a value obtained by subtracting an average of pixel data of the color pixels belonging to the upper row and an average of pixel data of the white pixels belonging to the lower row from a value obtained by multiplying an average of pixel data of the white pixels belonging to the upper row by an average of pixel data of the color pixels belonging to the lower row.

9. The image signal processor according to claim 7, wherein the second color ratio index is a value obtained by subtracting an average of pixel data of color pixels belonging to the left column and an average of pixel data of white pixels belonging to the right column from a value obtained by multiplying an average of pixel data of white pixels belonging to the left column by an average of pixel data of color pixels belonging to the right column.

10. The image signal processor according to claim 7, wherein:

the pattern direction determiner is configured to determine the pattern direction of the target kernel to be horizontal when the first color ratio index is less than the second color ratio index; and the demosaicing component is configured to perform the interpolation operation using pixel data of pixels belonging to a row having a same attributes as a row to which a target pixel belongs, without using pixel data of pixels belonging to a row having different attributes from the row to which the target pixel belongs.

11. The image signal processor according to claim 7, wherein the pattern direction determiner is configured to determine the pattern direction of the target kernel to be vertical when the first color ratio index is greater than the second color ratio index; and the demosaicing component is configured to perform the interpolation operation using pixel data of pixels belonging to a column having a same attributes as a column to which a target pixel belongs, without using pixel data of pixels belonging to a column having different attributes from the column to which the target pixel belongs.

12. An image signal processing method comprising:

calculating a gradient index for each of a plurality of directions in a target kernel;

determining whether the target kernel corresponds to a stripe pattern based on the gradient index for each of the plurality of directions;

determining a pattern direction of the target kernel when the target kernel corresponds to the stripe pattern; and performing an interpolation operation based on the pattern direction of the target kernel, wherein the determining the pattern direction of the target kernel includes:

calculating a first color ratio index indicating a degree to which a color ratio between pixel data values of color and white pixels belonging to an upper row within a horizontal pixel block of the target kernel and another color ratio between pixel data values of color and white pixels belonging to a lower row within the horizontal pixel block of the target kernel, are maintained; and calculate a second color ratio index indicating a degree to which a color ratio between pixel data values of color and white pixels belonging to a left column within a vertical pixel block of the target kernel and another color ratio between pixel data values of color and white pixels belonging to a right column within the vertical pixel block of the target kernel, are maintained.

13. The image signal processing method according to claim 12, wherein:

the plurality of directions includes a horizontal direction, a vertical direction, a first diagonal direction, and a second diagonal direction, and gradient indices for the plurality of directions include a first gradient index for the horizontal direction, a second gradient index for the vertical direction, a third gradient index for the first diagonal direction, and a fourth gradient index for the second diagonal direction.

14. The image signal processing method according to claim 13, wherein the determining whether the target kernel corresponds to the stripe pattern includes:

determining whether the target kernel corresponds to the stripe pattern depending on whether a stripe condition based on the first to fourth gradient indices is satisfied, wherein the stripe condition is a condition in which the third gradient index is greater than a value obtained by multiplying a sum of the first gradient index and the second gradient index by a preset weight, and the fourth gradient index is greater than a value obtained by multiplying a sum of the first gradient index and the second gradient index by the preset weight.

15. The image signal processing method according to claim 13, further comprising determining an interpolation direction by comparing the first to fourth gradient indices with each other, when the target kernel does not correspond to the stripe pattern.

16. An electronic device comprising:

a processor; and a memory storing instructions executed by the processor, wherein the instructions, when executed by the processor, cause the electronic device to:

calculate a gradient index for each of a plurality of directions in a target kernel;

determine whether the target kernel corresponds to a stripe pattern based on the gradient index for each of the plurality of directions;

determine a pattern direction of the target kernel when the target kernel corresponds to the stripe pattern; and perform an interpolation operation based on the pattern direction of the target kernel, wherein the plurality of directions includes a horizontal direction, a vertical direction, a first diagonal direction, and a second diagonal direction, wherein gradient indices for the plurality of directions include a first gradient index for the horizontal direction, a second gradient index for the vertical direction, a third gradient index for the first diagonal direction, and a fourth gradient index for the second diagonal direction, and wherein determining whether the target kernel corresponds to the stripe pattern includes determining whether the target kernel corresponds to the stripe pattern depending on whether a stripe condition based on the first to fourth gradient indices is satisfied, wherein the stripe condition is satisfied when the third gradient index is greater than a value obtained by multiplying a sum of the first gradient index and the second gradient index by a preset weight, and the fourth gradient index is greater than the value obtained by multiplying the sum of the first gradient index and the second gradient index by the preset weight.

* * * * *